C. G. HARCOURT.
VALVE.
APPLICATION FILED MAY 11, 1904.
928,751.
Patented July 20, 1909.
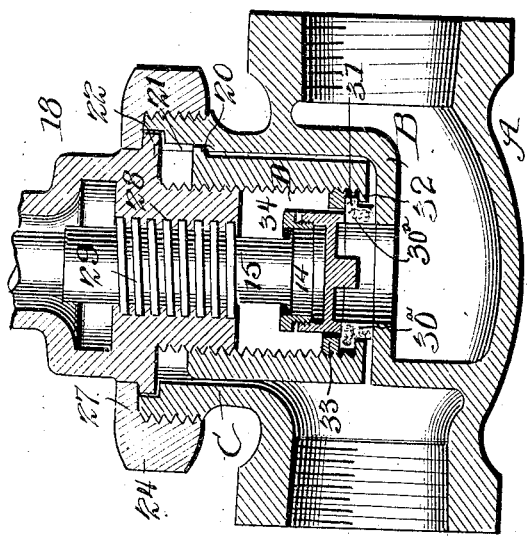
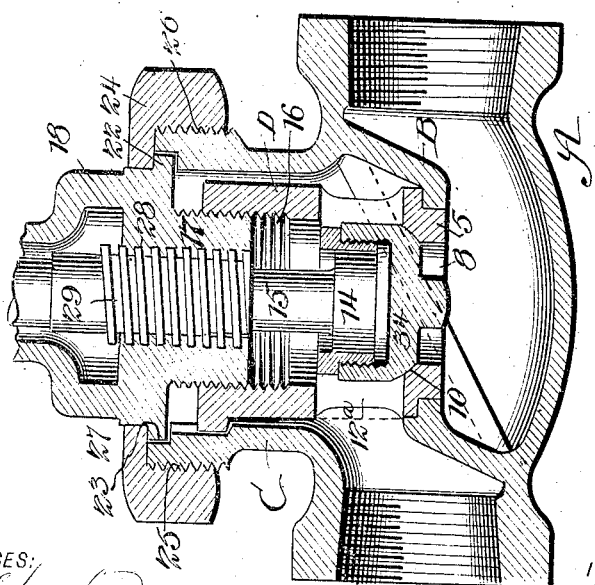
WITNESSES:
G. P. Kingsbury
V. E. Nichols
INVENTOR
Charles G. Harcourt
BY Griffin, Bernhard & Cavanagh
ATTORNEYS.

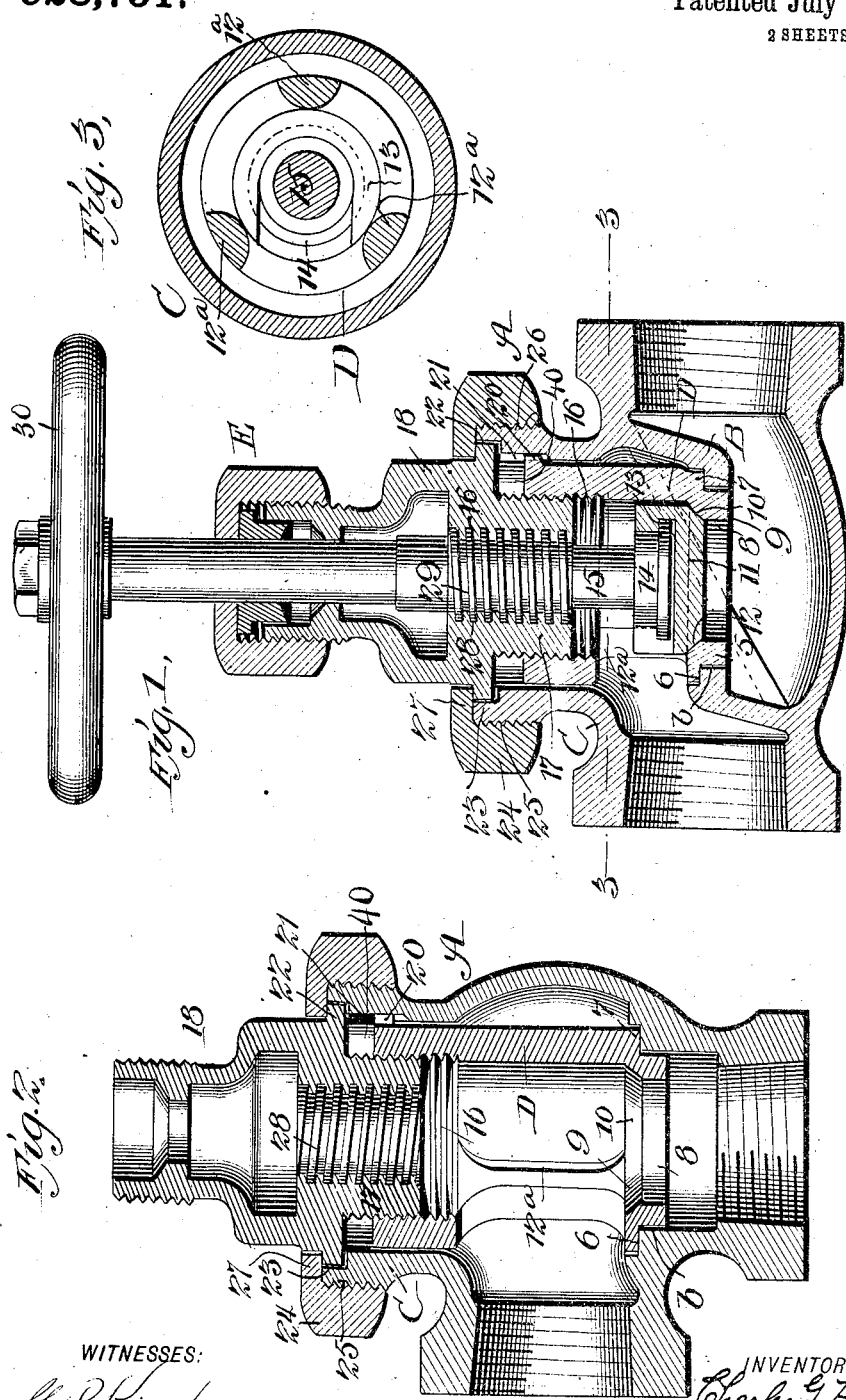
C. G. HARCOURT.
VALVE.
APPLICATION FILED MAY 11, 1904.
928,751.
Patented July 20, 1909.
2 SHEETS—SHEET 1.

UNITED STATES PATENT OFFICE.

CHARLES G. HARCOURT, OF BROOKLYN, NEW YORK.

VALVE.

No. 928,751.　　　　Specification of Letters Patent.　　　Patented July 20, 1909.

Application filed May 11, 1904. Serial No. 207,491.

*To all whom it may concern:*

Be it known that I, CHARLES G. HARCOURT, a citizen of the United States, residing in the city of Brooklyn, county of Kings, and State of New York, have invented certain new and useful Improvements in Valves, of which the following is a specification.

This invention appertains to certain novel and useful improvements in valves, and has particular application, broadly considered, to a device of the class described designed to be provided with a removable seat, and specifically relates to a valve having a removable seat ring actuated from the valve bonnet or hub.

In carrying out the present invention I have in contemplation so constructing my valve that the operating element thereof, which is employed to actuate the seat ring, is combined with and forms a part of the valve bonnet or hub, being preferably formed integral therewith, thus reducing the number of parts. Furthermore, ready and convenient access may be had to the operating member at all times. Furthermore by forcing the seat ring and the hub apart or away from each other, as during the operation of unscrewing, it is possible to obtain a perfect steam tight joint both at the bearing of the seat ring and at the seat of the operating hub. By reversing the operation, or screwing the members together the seat ring may be withdrawn from its bearing in the diaphragm. Thus it will be noted that the means for seating and unseating the ring is the hub, an essential element of the valve. Should the seat stick or become jammed in the diaphragm, it may be withdrawn by the hub without resorting to the use of special tools or equipment. Furthermore my invention is applicable to all the types of valves commonly in use, such as the globe, angle, cross or Y-valves, or the horizontal, angle, vertical or swing check valves and plug cocks. I also aim to provide a valve which will embody the desired features of economy, simplicity, durability and convenience.

My invention consists in the construction, combination and arrangements of parts set forth in and falling within the scope of the appended claims.

In the accompanying drawings like characters indicate like parts in all the figures.

Figure 1 is a vertical sectional view of a valve embodying my improvements, the valve stem being shown in elevation. Fig. 2 is a sectional view of an angle valve provided with my improvements. Fig. 3 is a horizontal sectional view taken through a valve on approximately the line 3—3 of Fig. 1. Fig. 4 is a vertical sectional view, illustrating another means of securing the valve disk to the stem. Fig. 5 is a sectional view of another modified form of valve disk and packing ring therefor.

Referring now to the accompanying drawings in detail, the letter A indicates an ordinary valve body, having the interior diaphragm or wall B, and the tubular extension C, lying at an angle to the body and communicating therewith, the exterior wall of said tubular extension being circumferentially threaded, for a purpose hereinafter described. The wall or diaphragm B is provided with a central aperture or opening b designed to permit of the seating of the lower edge 5 of the seat ring D, a shouldered groove, as at 6, being formed in the portion of the diaphragm or wall surrounding the aperture b, the construction being such that an even, flush, steam-tight joint can be formed between the contiguous part of the diaphragm and the flanged portion 7 of the seat ring. Into the upper chamber formed by the tubular extension C and the diaphragm B, is designed to be placed the valve seat-ring D, hereinbefore mentioned, said seat ring, comprising a tubular, approximately cylindrical member having an opening 8 formed in its bottom wall 9, the upper interior edge of such wall being beveled, as at 10, to form a seating surface for the valve disk 11, the part of said disk designed to contact with the seat being correspondingly beveled, as indicated at 12. The main body portion of the valve seat ring proper is cut away or apertured longitudinally to form the vertical legs 12ª which are adapted to act as retaining guides for the valve disk when the latter is vertically reciprocated, that is to say, such legs contact with and hold the valve disk against lateral movement, thus insuring that the latter will be retained against accidental displacement. The disk is provided with a horizontal groove 13, which groove communicates with the edge of the valve disk so that the latter may be slipped on the head 14 of the valve stem 15. The inner wall of the valve seat ring, above the leg portions thereof, is threaded as at 16, to receive the projection 17 of the valve hub or bonnet 18, the exterior surface of the portion 17 having a plurality of circumferential threads designed to screw into the threads of the seat ring. It will further be noted that the seat ring is provided with a key or feather 20, adapted to normally lie in a vertical groove or slot 21 formed in the wall of the portion C, so while free vertical movement is permitted to said seat it will be held against rotation. The hub or bonnet is adapted to revolve freely in a groove formed as hereinafter described and is provided above its threaded portion 17, with a circumferential flange 22, somewhat similar to the flange 7 of the seat. The interior upper edge of the wall of the tubular body portion C is cut away to form a groove as at 23, to permit the seating of this flange, and the bonnet or hub is securely coupled and held in rotatable position relative to the valve body through the medium of a union ring 24 which latter is threaded at 25 to interlock with corresponding threads 26 formed exteriorly and circumferentially of the member C, the flange 27 of said ring making a steam tight joint with the body and overlying the flange of the hub or bonnet, thus retaining the latter against displacement. The groove 23, formed for the reception of the flange of the hub, is of slightly greater width and depth than the flange itself, so that the bonnet or hub may be freely rotated when desired to move the seat to and from its bearing without the flange of the bonnet striking or jamming against adjacent parts. The bonnet or hub is provided with the usual threaded, central vertical bore 28 through which passes the threaded portion 29 of the stem 15, said stem extending entirely through the hub or bonnet and is provided with the ordinary hand wheel 30 at its free upper end, while the usual stuffing box and packing gland shown at E, are provided for the top of the hub.

From the above description taken in connection with the accompanying drawings the construction and operation of my improved valve will be readily apparent. In assembling the valve the seat ring is first threaded all the way onto the projecting portion of the hub or bonnet by turning toward the left. These parts are then passed into the hub opening or tubular extension C, care being taken to have the key or feather 20 move into its keyway or slot. The coupling ring 24 is then applied and tightened in position and the hub or bonnet is turned by means of a wrench or other suitable tool, until the flange or shoulder of such hub contacts with the under side of the coupling ring, such movement of the hub serving to force the valve seat vertically downward until a fluid tight joint is formed at the bearing surface of the diaphragm and simultaneously at the point of juncture of the top of the hub or bonnet and the under side of the coupling ring. The gland, stuffing box and hand wheel may then be applied and the valve is ready for use. In taking out a seat ring the coupling ring is first disengaged from the bonnet or hub, and by applying a wrench to the facets of the latter and turning toward the right the seat will be withdrawn, the clearance space 40 permitting of this, and the seat ring may then be removed from the body with the hub. The seat can then be unscrewed from the bonnet or hub and a new one substituted.

In Fig. 2 I have shown my improvement as applied to an angle valve, the valve disk and stem being omitted.

In Fig. 5 another means is shown for retaining the disk in position, and a composite packing ring is employed. In said Fig. 5, the numeral 30ª indicates a composite packing ring having a flange 31 interlocking with the interiorly extending flange 32 of the seat ring extension, a retaining collar 33 of brass or other suitable material being threaded into the extension and bears against the top of the packing ring, clamping the latter. The valve disk 34 is formed of two parts threaded together, said disk having an extension 35 to which a wrench may be applied to assist in the threading together of said members.

An important feature of my valve is the construction and correlation of the two elements, the seat ring proper and the hub or bonnet operating the same, whereby one of said elements will be moved away from the other in the operation of unscrewing, the valve hub serving to all intents and purposes as a means for operating the seat. The coupling ring is employed on the hub opening to form a steam tight joint with the top of the valve body C, the removal of the coupling ring permitting the introduction of the hub or bonnet threaded projecting portion which engages the seat, the flange of the hub forming a steam tight joint with the under side of the coupling ring. Now, it will be evident, that no matter what distance the under surface of the coupling ring is from the bearing surface of the seat ring in the diaphragm, it is at all times possible to obtain steam tight joints simultaneously.

While I have herein shown and described my preferred form of valve, I wish it to be understood that I do not limit myself to the details of construction set forth as modification and variation may be made without departing from the spirit of the invention or the scope of the claims.

Having thus described my invention what I claim is:—

1. A valve comprising a body portion having an opening therein, a removable seat threaded on its interior surface, a rotatable hub member for reciprocating the seat and having an extension exteriorly threaded designed to screw into the threaded portion of the seat, a shoulder on said hub, and a flange extending inward of the hub opening in the valve body, and designed to overlie the shoulder of the hub.

2. A valve, comprising a body portion having a groove formed therein, a movable seat portion having an inwardly extending seating surface for the valve disk, a feather or key formed integral with said seat and adapted to lie in the groove to prevent the rotation of the seat, and a hub member threaded into said seat and adapted to impart a reciprocating movement to the latter.

3. A valve comprising a body portion, a movable seat portion having an inwardly extending bearing surface for the valve disk, guide members integral with the seat portion for retaining the valve disk in position, and means engaging with said seat portion for imparting a reciprocating movement to the latter.

4. A valve comprising a body portion, a removable seat portion having a laterally projecting surface for the seating of the valve disk, a threaded hub member engaging with the interior face of the removable seat portion, a shoulder formed on said hub member and adapted to lie in a groove formed in the valve body, and a coupling ring connected to the valve body and projecting above the shouldered portion of the hub, the construction being such that the hub may freely rotate in its groove.

5. A valve, comprising a body portion having a diaphragm adapted to receive a movable seat ring portion, said latter having an inward laterally extending bearing surface for the seating of the valve disk, and a shouldered portion adapted to seat upon the diaphragm of the valve body, a hub member threaded into engagement with the removable seat ring portion, a shoulder formed on said hub designed to lie in a groove formed in the valve body, and a coupling member threaded into engagement with the valve body and having a flange extending over the shouldered portion of the hub.

6. In a valve a body having a diaphragm, a reciprocating seat formed with an inwardly extending bearing surface for the valve disk, and a hub member formed with a threaded projection extending into said seat and adapted when rotated to force the seat into and out of a fluid tight joint with its bearing.

7. A valve comprising a body portion, a reciprocating seat portion therein having a bearing surface for the seating of the valve disk, a rotatable hub member having an extension threaded into engagement with the interior surface of the seat portion, such hub having an outwardly extending shoulder adapted to lie in a groove formed in the valve body, and a coupling ring threaded onto the valve body, and having an inwardly extending flange overlying the shoulder of the hub, the construction being such that the hub is free to rotate to reciprocate the seat portion.

8. In a valve a movable seat portion, a rotatable hub member threaded into engagement with the seat portion, a valve stem extending through the hub member, a valve disk carried by the stem, and a coupling ring threaded onto the valve body and having an inwardly extending flange, the construction being such that the hub is free to rotate to reciprocate the seat portion.

9. A valve comprising a body portion, a removable seat portion having a seating surface for the valve disk, a hub member turning in the valve body and engaging with the seat portion, the construction being such that both the hub and the seat portion may be simultaneously moved into and out of fluid-tight engagement with adjacent surfaces.

10. A valve comprising a body portion having a hub opening therein, a diaphragm in said body, a rotatable hub having a limited endwise movement, a stem passing through the hub, a reciprocating seat operated by the rotation of the hub, a valve disk removably attached to the stem and retained in position on said stem by surfaces of the removable seat.

In testimony whereof I have signed my name to this specification in the presence of two witnesses.

CHARLES G. HARCOURT.

Witnesses:
JAS. H. GRIFFIN,
V. E. NICHOLS.